United States Patent
Ley et al.

(10) Patent No.: US 11,392,536 B2
(45) Date of Patent: Jul. 19, 2022

(54) METHOD AND APPARATUS FOR MANAGING FEATURE BASED USER INPUT ROUTING IN A MULTI-PROCESSOR ARCHITECTURE

(71) Applicant: MOTOROLA SOLUTIONS, INC., Chicago, IL (US)

(72) Inventors: David J Ley, Plantation, FL (US); Carlos J Robaina, Miramar, FL (US); Mark Antilla, Davie, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 499 days.

(21) Appl. No.: 16/661,880

(22) Filed: Oct. 23, 2019

(65) Prior Publication Data

US 2021/0124712 A1    Apr. 29, 2021

(51) Int. Cl.
| | | |
|---|---|---|
| *G06F 3/00* | (2006.01) | |
| *G06F 15/82* | (2006.01) | |
| *G06F 9/54* | (2006.01) | |
| *G06F 3/16* | (2006.01) | |
| *G06F 3/02* | (2006.01) | |

(52) U.S. Cl.
CPC .............. *G06F 15/82* (2013.01); *G06F 3/02* (2013.01); *G06F 3/167* (2013.01); *G06F 9/54* (2013.01)

(58) Field of Classification Search
CPC ........................................................ G06F 9/54
USPC ........................................................ 719/310
See application file for complete search history.

(56) References Cited

U.S. PATENT DOCUMENTS

| | | | |
|---|---|---|---|
| 9,614,572 B2 | 4/2017 | Ley et al. | |
| 2009/0182914 A1* | 7/2009 | Matsui | G11C 7/1075 |
| | | | 711/E12.002 |
| 2013/0219272 A1 | 8/2013 | Balasubramanian et al. | |
| 2015/0277934 A1 | 4/2015 | Zhang et al. | |
| 2016/0007136 A1 | 1/2016 | Chen et al. | |
| 2016/0364350 A1* | 12/2016 | Sanghi | G06F 13/4027 |
| 2017/0277311 A1 | 9/2017 | Pollock et al. | |
| 2019/0026737 A1* | 1/2019 | McLaughlin | G06Q 20/40 |

(Continued)

FOREIGN PATENT DOCUMENTS

DE              3644066 C2 *    3/2000         ............. H03D 3/006

OTHER PUBLICATIONS

Liangbo Xie, Low Power Baseband Processor with Clock Variance-Tolerant for UHF RFID Transponder. (Year: 2013).*

*Primary Examiner* — Lechi Truong
(74) *Attorney, Agent, or Firm* — Barbara R. Doutre

(57) ABSTRACT

Improved management of user based input to a converged portable communication device is provided. A primary processor is configured to detect a user input feature request in response to a user interface control being activated. The primary processor determines whether the user input feature request is one of: a primary processor-centric request or a secondary processor-centric request. The primary processor retains primary requests and routes secondary requests to a secondary processor. If the secondary processor is unable to perform the requested feature, a check is made whether the primary processor is available and can fulfill the request as a secondary request. Positive user feedback is generated in response to determine that requests can be handled, and negative user feedback is generated when a requested feature cannot be handled.

12 Claims, 2 Drawing Sheets

(56) References Cited

U.S. PATENT DOCUMENTS

2019/0278637 A1* 9/2019 Sukhija ................ H04L 63/123
2020/0033932 A1   1/2020 Sachs et al.

* cited by examiner

METHOD AND APPARATUS FOR MANAGING FEATURE BASED USER INPUT ROUTING IN A MULTI-PROCESSOR ARCHITECTURE

FIELD OF THE INVENTION

This application is related to PAT24943, Ser. No. 16/661,850 filed Oct. 23 2019, commonly assigned and filed of even date.

This application pertains to communication devices and more particularly to portable communication devices that handle user selectable features that are controlled by different processors.

BACKGROUND OF THE INVENTION

Portable battery powered communication devices are often utilized in public safety environments, such as law enforcement, fire rescue, and the like. These devices may provide mission critical communications operating over a public safety platform, such as a land mobile radio (LMR) platform or the like. There is an increased desire to expand the functionality of public safety communication devices to incorporate additional non-mission critical features which run on different operating platforms, for example an Android platform or other non-mission critical operating platform. However, incorporating multiple user selectable features that run on different platforms creates challenges in input routing in terms of prioritization of some inputs over others, particularly during power up conditions. The reliable management of user selectable features is needed to ensure that mission critical communications are maintained and take priority over non-mission critical features. At the same time, it is important to provide an improved user interface that increases user awareness pertaining to the selected features.

Accordingly, an improved approach to managing feature based user inputs in a multi-platform portable communication device is needed.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
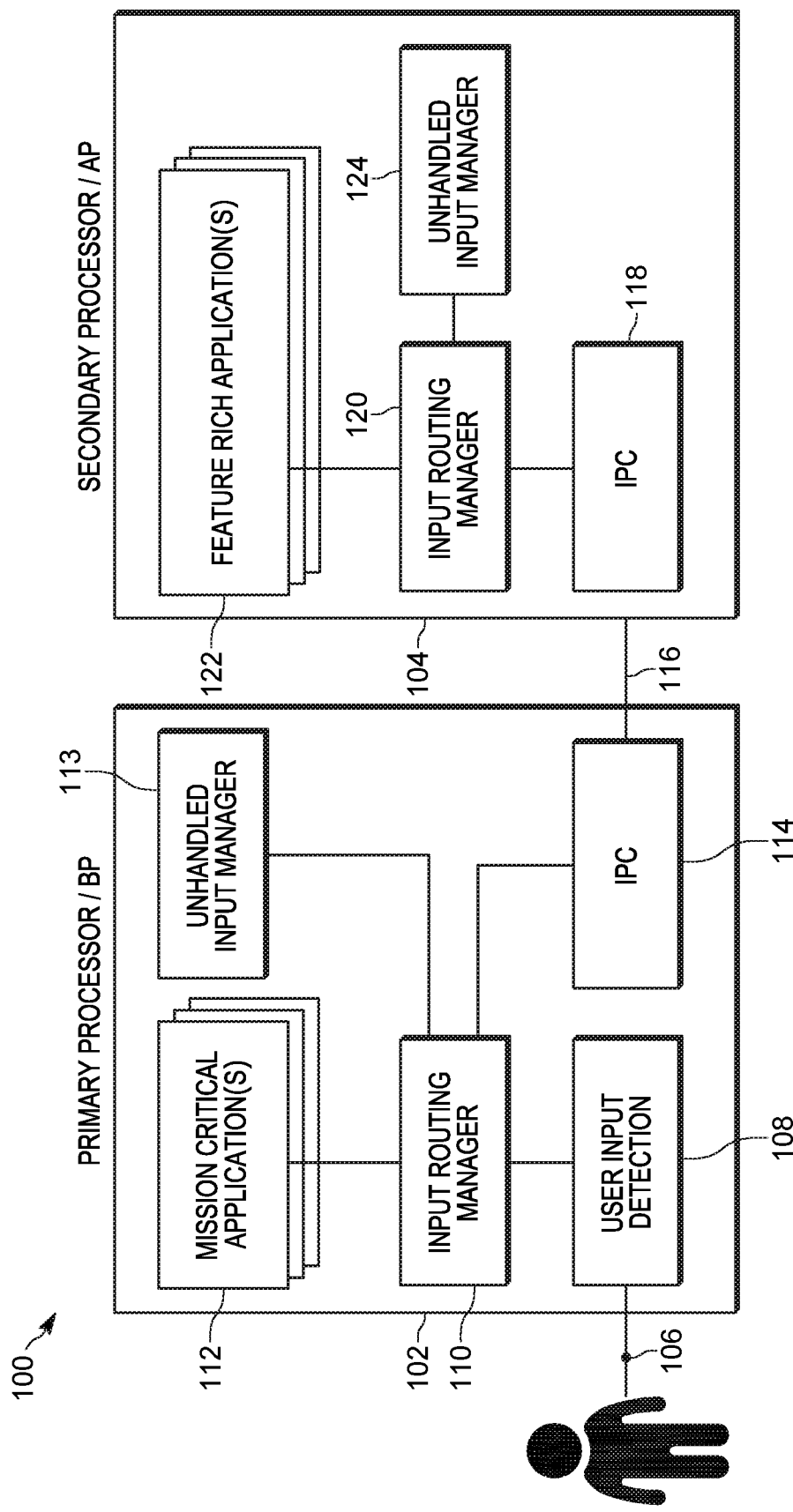
FIG. 1 is a block diagram of a portable communication device formed and operating in accordance with various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Briefly, there is provided herein an apparatus and method for managing user based inputs to a portable communication device. The portable communication device described herein is a converged device that provides expanded functionalities by incorporating two or more different processors running on different operating systems, where one processor is considered a primary processor and other processor(s) is/are considered secondary processors. The primary processor is configured to route a primary processor-centric request to an application of the primary processor and generate positive user feedback. The primary processor is further configured to route a secondary processor-centric request from the primary processor to the secondary processor for handling and generation of positive user feedback. If the secondary processor cannot handle a secondary processor feature request, a check is made to determine if the primary processor is available and can handle the secondary feature request. When feature requests cannot be performed by either processor then a negative user feedback is generated.

The converged device may comprise, for example a primary, baseband processor running on a land mobile radio (LMR) operating system, or other wireless operating system handling mission critical applications, and further comprise a secondary, applications processor handling non-mission critical applications. For example, the secondary applications processor may control running of LTE, WiFi or Bluetooth operating systems or other operating systems different from the primary processor operating system. The embodiments described herein pertain to managing user input requests and routing of different functions. The challenges associated with application availability under varying power-up conditions is also addressed.

FIG. 1 is a block diagram of a portable communication device 100 formed and operating in accordance with various embodiments. The block diagram is representative of a controller section of the portable communication device 100, and it is to be appreciated that other sections, such as transmitter, receiver, audio, power, and battery have been omitted to maintain simplicity. The portable communication device 100 is a portable battery powered converged device operational under the control of at least two different processors operating on two different operational software platforms. It is to be appreciated, that while described in terms of a converged portable communication device, the block diagram may also be applied to a portable converged system comprising a portable radio and a smart accessory, where one processor is located in the portable radio and the other, different processor, is located in the accessory. The various control sections described within the block diagram of FIG. 1 (modules, detectors, routing managers, etc.) may be implemented using software modules, software modules with hardware inputs and software modules with hardware outputs.

The portable communication device 100 comprises a primary processor 102 and a secondary processor 104 operatively coupled to the primary processor. A user interface control 106, such as a button or keypad external to the device, is operatively coupled to the primary processor 102. In accordance with the embodiments, the primary processor 102 is configured, such as through a user input detection module 108, to detect a user input feature request in response to the user interface control 106 being activated.

The primary processor 102 is further configured to determine, through an input routing manager 110, whether the user input feature request is one of: a primary processor-centric request or a secondary processor-centric request.

In accordance with the embodiments, the primary processor 102 routes a primary processor-centric request, via an input routing manager 110, to an application stored in an applications module 112 of the primary processor for handling. In accordance with the various embodiments, the primary processor 102 also generates a positive user feedback to notify the user that the primary processor-centric request will be handled. If the input routing manager 110 determines that a primary processor-centric request cannot be handled, the request is forwarded to an unhandled input manager module 113, and negative feedback is generated to notify the user that the primary processor-centric request cannot be handled The primary processor 102 routes, such as via an inter-processor communications module (IPC) 114, a secondary processor-centric request from the primary processor to the secondary processor for handling, in response to the primary processor determining that an incoming feature request is a secondary processor-centric request and that the secondary processor is available. The secondary processor 104 receives the secondary processor-centric request through a communications link 116 (a physical connection carrying protocol messages) coupling the primary IPC 114 to a second IPC 118 located in the second processor 104.

In accordance with the various embodiments, the secondary processor 104 is configured, by second routing manager 120 to determine availability of a secondary processor application, stored within secondary application module 120, to handle the secondary processor-centric request routed thereto. The secondary applications stored within secondary applications module 122 may comprise, for example, non-mission critical applications. The secondary processor 104 is further configured to generate a positive user feedback in response to determining availability of the secondary processor application and to perform the secondary processor-centric request using the available secondary processor application.

In accordance with the various embodiments, the secondary processor 104 is further configured, via an secondary unhandled input manager 124, to generate a negative user feedback in response to determining unavailability of a secondary processor application to handle the input feature request.

The input feature request may be determined to be a mission critical feature request or a non-mission critical feature request. The user interface control 106 may comprise one or more buttons, keys or some other input switch detectible by user input detection 108. A button may mapped to a mission critical feature and another button may be mapped to a non-mission critical feature. A look-up table of the primary processor may be used to map particular button inputs on a device for processing within the primary processor/operating system versus the secondary processor/operating system. For example a button ID or other identifier may be matched against the look-up table, so that requests are routed to the correct processor for handling. The mapping can be created, stored, and updated allowing for the customization of user interface controls on the device. Mission critical requests are given priority and are handled by the primary processor 102. Non-mission critical requests may be handled by the secondary processor 104 as long as both the secondary processor and the secondary application feature within the processor are available. Depending on the request, a secondary application may be allowed to run concurrently with a primary application. If there is no contention with the primary processor, then the secondary feature request will be allowed. If there is contention, then the application having the higher priority of the most recent request will be the only application allowed to run.

Management of secondary, non-mission critical request routing and handling is optimized between the two processors 102, 104. If the secondary processor-centric request can be handled by the secondary processor, the request is formed and positive feedback is generated. If the secondary processor-centric cannot be handled by the secondary processor, but can be handled by the primary processor as a secondary feature, then the request is handled and performed by the primary processor 102 and positive user feedback is generated. If the secondary processor-centric cannot be handled by the secondary processor 104 because the secondary application is not available, then negative user feedback is generated. The secondary processor-centric requests that cannot be handled may be forwarded to the secondary unhandled input manager module 124. The secondary unhandled input manager module 124 is responsible for determining the content of the negative feedback message. If the secondary processor-centric cannot be handled by the secondary processor 104 and cannot be handled by the primary processor 102, then negative user feedback is generated by secondary unhandled input manager module 124.

The conditions under which a secondary processor becomes unavailable may be one of: power up to secondary processor not yet complete; a low battery condition in which the secondary processor 104 has been shutdown to conserve power; or a predetermined thermal condition causing shutdown of a component required for a requested feature. For example, a display of the communication device may be shutdown under predetermined thermal conditions, and as such, resulting in a negative feedback tone or message in response to input requests that rely on the display.

The managing and routing of feature based user inputs in a multi-processor architecture is particularly advantageous to the end user, such as an officer or other public safety personnel, as the transfer of feature requests from one processor to another remains seamless, and the user is provided with feedback (both positive and negative) as appropriate. The embodiments can be extended to technician level testing where the generation of feedback is also advantageous for confirmation of test modes for different feature requests.

The primary processor generally handles primary processor-centric function requests, and the secondary processor generally handles secondary processor-centric function requests. The selection of the processor to handle a function in response to activation of the user interface input control is advantageously seamless to the user. In other words, the user is not made aware of which processor is handling a particular function. The user is advantageously provided with feedback that a function is being handled (or not being handled), regardless of the processor routing.

As an example embodiment, the primary processor 102 of the portable communication device 100 may comprise a baseband processor (BP), and the secondary processor may comprise an applications processor (AP) operatively coupled to the baseband processor via communications link 116. The baseband processor handles mission critical functionality and the applications processor manages non-mission critical functionality. For the purposes of this example, primary and secondary processors 102, 104 will be referred to respectively as BP and AP.

The user interface control may comprise a user interface button or key coupled to the user input detector 108 of the BP, the user interface button being mapped for both mission critical features associated with the BP and non-mission critical features associated with the AP, and the mapping being managed by the input routing manager.

The power up operations of such a converged device are enabled by turning on the device with a control interface, in response to which the BP powers up first, and is available to handle BP feature requests, such as mission critical requests. For example, a push-to-talk (PTT) button may be coupled to the user input detector 108 of the BP, the PTT button being managed by the BP to enable a mission critical PTT application that provides transmission of LMR voice. Mission critical PTT application is available upon power up of the BP.

The AP powers up a predetermined time (for example 20 ms) after the BP. During this interim power up time (BP fully powered/AP not fully powered), a user is now advantageously able to access features previously unavailable, or at the very least the user is provided with user feedback indicating that the feature is not yet available. For example, a voice control feature (normally handled by the AP), may be handled by the BP during the power up of the AP. Positive user feedback may be generated via an audible or display alert, for example "voice control enabled". If a feature cannot be enabled by either processor, negative feedback is generated to the user. For example, an audible negative response tone or "voice control feature not yet available, please wait a moment" message may be generated. Again, unhandled secondary feature requests and the management of feedback generation in response thereto is handled by secondary unhandled request input manager module 124. The conditions under which a secondary processor/AP 104 becomes unavailable may be due to one of: power up to secondary processor not yet complete; a low battery condition or other condition causing the secondary processor/AP to shutdown; or a display of the communication device being shutdown under predetermined thermal conditions, as certain features may rely on a display. Different negative user feedback can be generated based on the different conditions.

Figure 2:
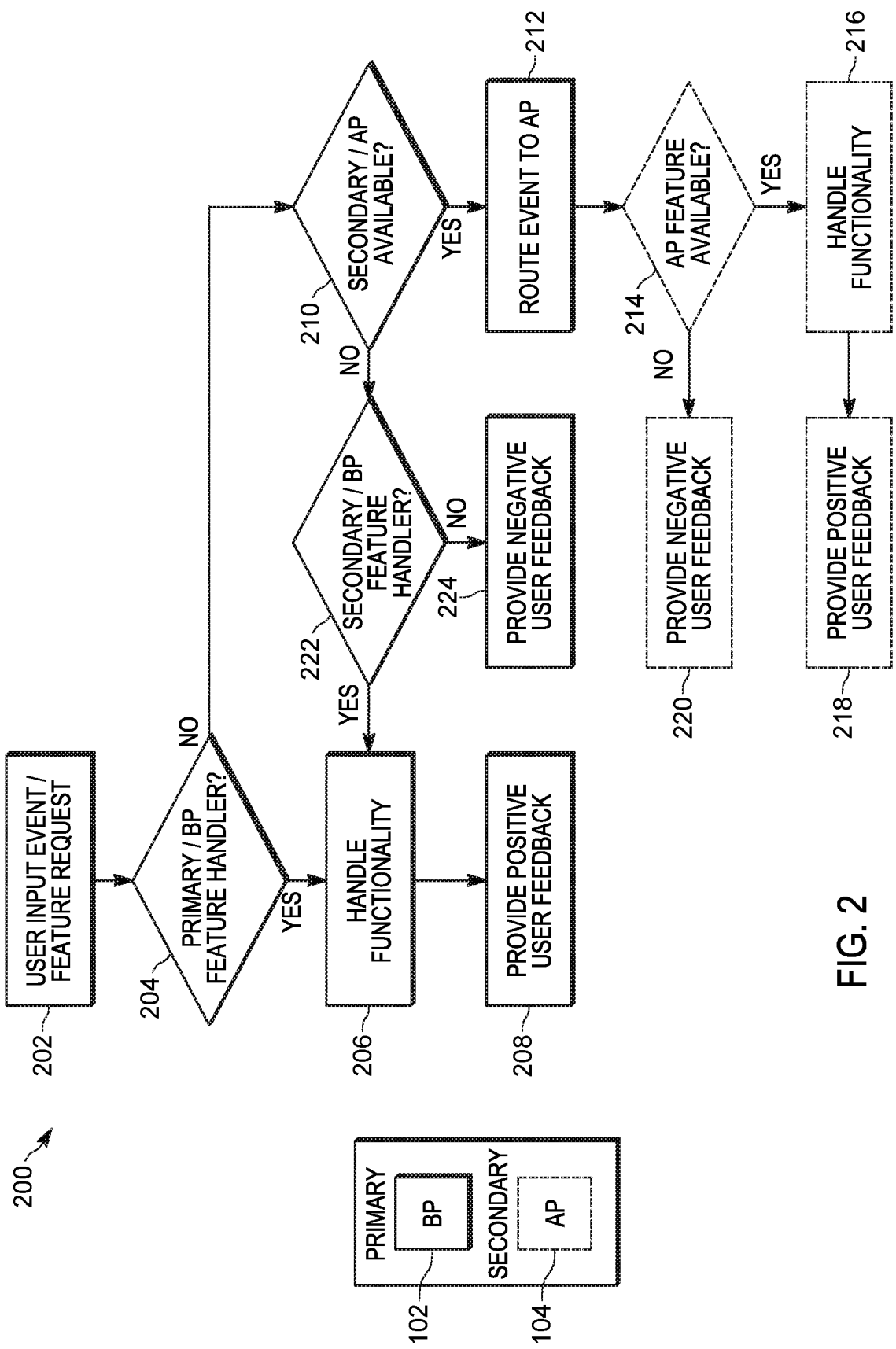
FIG. 2 is a flowchart of a method for managing a user based inputs to a portable communication device in accordance with various embodiments.

FIG. 2 is a flowchart of a method 200 for managing a user based input to a portable communication device formed and operating in accordance with various embodiments. The method begins at 202 with detecting, by a primary processor, a user input event indicative of a feature request to the device. The user input feature request may be entered, as previously described in FIG. 1, by a user interface control (106), such as a button, keypad or other external entry input to the device.

The method proceeds to 204, with the primary processor determining that the input feature request is one of a primary processor-centric feature request or a secondary processor-centric feature request. When the user input feature request is determined to be a primary processor-centric feature request at 204, the method continues to 206 with the primary processor handling functionality and performing the primary processor-centric feature. At 208, the primary processor further generates a positive user feedback indicating that the primary centric feature is about to be performed.

Returning back to 204, when the primary processor determines that the user input feature request is a secondary processor-centric feature request (and not a primary processor-centric request), then the method moves to 210 where availability of a secondary processor is determined. Again, taking into consideration power up conditions, powering up of the primary processor occurs prior to the secondary processor, and as such determining availability of the secondary processor, is performed by the primary processor, and is based on power up status of the secondary processor and receipt, by the primary processor, of a trigger alert indicative of availability and capabilities of the secondary processor. Causes for the secondary processor not being available may be for example, that the secondary processor has not yet not fully powered up, as the secondary processors powers up after the primary processor. The secondary processor may have also been turned off as part of a low battery conditions to save current.

When, at 210, the secondary processor is determined to be available then the method proceeds to 212 where the secondary processor-centric feature request is routed to the secondary processor. The secondary processor then determines, at 214, if a secondary feature application is available to handle secondary feature request, and if so, then the functionality associated with that feature is handled and the feature is performed at 216 in conjunction with a positive user feedback being generated at 218.

Returning to 214, if the secondary processor determines that the secondary feature application is not available, then no feature is performed and negative user feedback is generated at 220, indicating to the user that the feature is not available.

When, at 210, the secondary processor is determined to not be available then the method proceeds to 222 where the primary processor is checked to determine whether the primary processor can fulfill the secondary processor-centric request. If so, then the secondary feature is performed by the primary processor at 206, along with positive user feedback being generated at 208.

Returning to 222, if the primary processor is unable to perform the secondary feature, then negative user feedback indicative thereof is generated at 224.

Method 200 thus advantageously provides user feedback under all conditions, regardless of whether the requested feature can be performed. Providing such user feedback increases user awareness of device operation.

Method 200 has been described in terms of a converged portable communication device comprising primary and secondary processors 102, 104, such as were described in FIG. 1 and which support different operating systems. Method 200 can also support a converged communication system formed of separate devices, such as a radio and user interface accessory, in which the primary processor 102 is located in one device and the secondary processor 104 is located in the second device.

As an example applicable to either the portable converged communication device or converged system, the primary processor may be a baseband processor (BP) operating on a first operational platform and the secondary processor may be an applications processor (AP) on a second, different operational platform. In some embodiments, the BP may operate in a 7/800 MHz land mobile radio (LMR) operating system and handle mainly mission critical features of the portable communication device, while the AP may operate a long term evolution (LTE) operating system and handle non-mission critical features. Feature requests are entered via the user interface input control such as by a button press, a keypad press, or other user interface entry and routed based on the mapping associated with control. Examples of mission critical features that can be managed via method 200 comprise, for primary/baseband processor channel scan, push-to-talk and emergency to name a few. Non-mission critical features may comprise, for example, programming scan lists for the secondary/applications processor, voice control, text messaging and camera functions to name a few.

Method 200 provides improved handling and routing of feature requests (mission critical and non-mission critical) input to a converged portable device or portable system, and generates user feedback in response to all requests, whether the feature can be performed or not.

The approaches provided herein facilitate the implementation of converged device by advantageously managing two processors operating in parallel, such as a baseband processor operating in a 7/800 MHz LMR band handling mainly mission critical requests and an applications processor operating in an LTE band handling non-mission critical requests. Applying method 200 to such a device, the baseband processor determines (204) if an input feature request is a request for baseband processor (BP) centric feature or a request for an applications processor (AP) centric feature.

A BP-centric feature is handled and performed by the BP (206), when the user input feature request is determined to be a BP-centric feature. Positive user feedback is generated (208) by the baseband processor in response to enabling the BP-centric feature by the BP.

When the user input feature request is an applications processor (AP) feature request (204) then availability of the applications processor (AP) is determined (210). When the AP is determined to be available (210), then AP-centric feature request is routed from the BP to the AP (212). The AP checks to determine if the requested AP-centric feature is available (214). If the AP-centric feature is available, then the AP handles the functionality, performs the AP feature and generates positive user feedback (218). For example, an audible tone, chirp, or message (audible and/or display) such as "voice control now enabled, please begin query" may be generated.

If the secondary processor determines that the AP feature application is not available (214), then no feature is performed and negative user feedback is generated (220). For example, an audible or displayed message of "sorry, voice control not ready to use" may be generated, or other tone or visual feedback may be generated.

When the AP is not be available (210) to handle an AP-centric feature request, then the primary BP is checked to determine whether the BP can handle the AP request as a secondary request (222). If the BP can handle the secondary request (for example, the BP is not in the midst of handling a mission critical BP feature), then the secondary AP feature is handled and performed by the BP (206), along with positive user feedback being generated (208).

If the BP is unable to perform the AP feature (for example, the BP is busy handling a mission critical BP feature or the BP is not equipped to handle the feature), then negative user feedback is generated (224).

User feedback can be adjusted based on the condition being managed by the different processors. For example, a negative audio tone can be generated (audible) or a message displayed when both processors are currently busy handling other functions. A feedback message of "please wait and retry feature request" can be generated when the AP has not completed power up, and the BP is not able to handle the request as a secondary request. A feedback message indicating the need to recharge the battery may be generated in response to a request occurring during a low battery condition in which the secondary processor/AP has been shutdown to conserve power. Audible feedback may be generated when a core functionality of the communication device needs to shutdown under predetermined thermal conditions. For example, the shutdown of a display module would result in a negative audible feedback to feature requests requiring a display.

The approaches provided herein facilitate the implementation of converged device by advantageously managing two processors operating in parallel. While examples of converged device having a baseband processor operating on a 7/800 MHz LMR band and a applications processor operating on an LTE band, it is to be appreciated that the primary and secondary processors may operate on other different operating systems. The embodiments advantageously facilitate managing user input events and providing the user with feedback, regardless of whether the function can be performed or not.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable communication device, comprising:
a primary processor;
a secondary processor operatively coupled to the primary processor;
a user interface control operatively coupled to the primary processor; and
the primary processor being configured to:
   detect a user input feature request in response to the user interface control being activated;
   determine whether the user input feature request is one of:
      a primary processor-centric request;
      a secondary processor-centric request;
   route a primary processor-centric request to an application of the primary processor in response to the primary processor determining a primary processor-centric request and generate positive user feedback; and
   route a secondary processor-centric request from the primary processor to the secondary processor for handling in response to the primary processor determining a secondary processor-centric request; and generate one of;
      positive user feedback when the secondary processor-centric request can be handled by the secondary processor; and
      when the secondary processor-centric request cannot be handled by the secondary processor, determining whether the primary processor can handle the user input event as a secondary feature;
   perform the secondary processor-centric request using an available primary processor application and generate a positive user feedback in response to determining that the primary processor application is available; and
   generate a negative user feedback in response to determining that the primary processor application is not available;
   wherein the primary processor is a baseband processor (BP) and the second processor is an applications processor (AP).

2. The portable communication device of claim 1, wherein unavailability of the secondary processors is based on one of:
   secondary processor having not completed power up;
   secondary processor being shutdown due to a low battery condition; and
   secondary processor being shutdown due to a thermal condition.

3. The portable communication device of claim 1, wherein the user interface control comprises:
   a button of the portable communication device provides a user interface for selecting mission critical features and non-mission critical features.

4. The portable communication device of claim 1, wherein the user interface control comprises: a user interface button coupled to a user input detector of the BP, the user interface button being mapped for both mission critical features associated with the BP and non-mission critical features associated with the AP, and the mapping being managed by an input routing manager of the primary processor.

5. The portable communication device of claim 1, wherein the user interface control comprises: a push-to-talk (PTT) button coupled to a user input detection of the BP, the PTT button being managed by the by the BP to enable a mission critical PTT application that provides transmission of LMR voice, the mission critical PTT application being available upon power up of the BP; a voice control button coupled to the user input detection of the BP, the voice control button enabling a voice control feature after a predetermined time of BP power up, the voice control feature being managed by the AP, the AP being configured via an AP input routing manager to provide: negative feedback when the voice control button is enabled prior to AP power up; positive feedback when the voice control button is enabled after AP power up.

6. The portable communication device of claim 1, wherein the baseband processor comprises: a user input detector for receiving the user input feature request; an input routing manager operatively coupled to the user input detector, the input routing manager determining the user input feature request as being one of: a mission critical feature request; and a non-mission critical feature request; the input routing manager enabling a mission critical application when the user input feature request is a mission critical feature request; and the input routing manager routing the user input feature request to a first inter-processor communication module when the user input feature request is a non-mission critical feature request.

7. The portable communication device of claim 6, wherein the applications processor comprises:
   a second inter-processor communication module operatively coupled to the first inter-processor communication module of the BP, the second inter-processor communication module for receiving the user input feature request when the user feature request is a non-mission critical feature request;
   an AP input routing manager operatively coupled to the second inter-processor communication module, the AP input routing manager determining the non-mission critical feature request as being one of:
      a non-mission critical feature request supported by the AP; and
      a non-mission critical feature request not supported by the AP;
   the input routing manager enabling a non-mission critical application when the input request is a non-mission critical feature request supported by the AP; and
   the input routing manager routing transferring a non-mission critical feature request not supported by the AP to an unhandled request input manager of the AP for generation of a negative user feedback indication.

8. A method of managing a user based input to a portable communication device, comprising:
   detecting a user input event;
   determining, by a baseband processor, that the user input event is a is user input feature request;
   determining, by the baseband processor, that the user input feature request is a request for a baseband processor (BP) centric feature or an applications processor (AP) centric feature;
   enabling a BP-centric feature by the BP processor when the user input feature request is determined to be a BP-centric feature;
   generating a positive user feedback in response to enabling the BP-centric feature by the BP;
   determining availability of an applications processor (AP) when the user input feature request is an applications processor (AP) feature request;
   routing an AP-centric feature request from the BP to the AP in response to the AP being available;
   determining whether an AP feature is available;
   when the AP feature is not unavailable, determining whether the BP can handle the user input event as a secondary feature;
      when the BP can handle the user input event as a secondary feature, handling the secondary feature by the BP and providing positive user feedback; and
      when the BP cannot handle the user input event as a secondary feature, generating negative user feedback.

9. The method of claim 8, further comprising powering up the portable communication device by applying power to the baseband processor prior to the applications processor; and
   providing negative user feedback in response to the user input event being associated with an AP processor prior to the AP processor being fully powered up.

10. The method of claim 8, wherein the BP is powered up prior to the AP, and detecting a user input feature request further comprises one of:
   detecting a push-to-talk (PTT) button press and transmitting LMR voice when the BP is powered up;
   detecting a voice control button press prior to the AP being powered;
   providing negative user feedback when the voice control button is pressed prior to the AP being powered; and
   providing positive user feedback and performing the voice control feature when the voice control button is pressed after the AP is powered up.

11. The method of claim 8, wherein BP-centric features comprise mission critical features, and AP-centric features comprise non-mission critical features.

12. The method of claim 8, wherein BP performs mission critical features and the AP performs non-mission critical features, and the BP performs non-mission critical features when the AP is unavailable prior to full power up of the AP.

* * * * *